(12) United States Patent
Withers

(10) Patent No.: US 8,468,301 B2
(45) Date of Patent: Jun. 18, 2013

(54) WRITING OF DATA ON AN ARRAY OF STORAGE DEVICES WITH CONTROLLED GRANULARITY

(75) Inventor: Nicholas Hugh Withers, Bicester (GB)

(73) Assignee: PLX Technology, Inc., Sunnyvale, CA (US)

( * ) Notice: Subject to any disclaimer, the term of this patent is extended or adjusted under 35 U.S.C. 154(b) by 723 days.

(21) Appl. No.: 12/227,449

(22) PCT Filed: May 18, 2007

(86) PCT No.: PCT/GB2007/001825
§ 371 (c)(1),
(2), (4) Date: Nov. 18, 2008

(87) PCT Pub. No.: WO2007/135381
PCT Pub. Date: Nov. 29, 2007

(65) Prior Publication Data
US 2009/0144497 A1    Jun. 4, 2009

(51) Int. Cl.
*G06F 12/00*    (2006.01)
(52) U.S. Cl.
USPC .......................................... 711/114; 714/6.32
(58) Field of Classification Search
USPC .......................................... 711/114; 714/6.22
See application file for complete search history.

(56) References Cited

U.S. PATENT DOCUMENTS

| | | | | |
|---|---|---|---|---|
| 5,130,992 A | * | 7/1992 | Frey et al. ..................... | 714/766 |
| 5,333,305 A | | 7/1994 | Neufeld | |
| 5,412,661 A | * | 5/1995 | Hao et al. ..................... | 714/6.12 |
| 5,754,756 A | * | 5/1998 | Watanabe et al. ............ | 714/6.21 |
| 5,845,319 A | * | 12/1998 | Yorimitsu ..................... | 711/114 |
| 6,195,727 B1 | * | 2/2001 | Islam et al. ................... | 711/114 |
| 6,343,343 B1 | | 1/2002 | Menon et al. | |

(Continued)

FOREIGN PATENT DOCUMENTS

| WO | 02/29539 A2 | 4/2002 |
|---|---|---|
| WO | WO 2007135381 A2 * | 11/2007 |

OTHER PUBLICATIONS

Patterson, Gibson and Katz, "A Case for Redundant Arrays of Inexpensive Disks (RAID)", in ACM Conf. on Management of Data (SIGMOD), pp. 109-116, Chicago, IL, USA, Jun. 1988.
Webpage:http://en.wikipedia.org/wiki/Redundant_array_of_independent_disks, downloaded Feb. 27, 2006.

*Primary Examiner* — Hong Kim
(74) *Attorney, Agent, or Firm* — Beyer Law Group LLP

(57) ABSTRACT

A disk array control apparatus controls writing of data onto an array of N storage devices such as disk drives, where N is an integer of 3 or greater. Each storage device writes data with a granularity of a sector having a predetermined sector size. The apparatus writes data with a granularity of a transfer unit having a transfer size which is T times the sector size, where T is a plural integer greater than (N−1). The apparatus is allows writing to an array of storage devices for which (N−1) is not a factor of T. In particular, the apparatus divides each transfer unit of data into plural stripes each consisting of a respective plural number of sectors of data having the sector size, the stripes each consisting of at most (N−1) sectors and at least one of the stripes consisting of less than (N−1) sectors, and calculates, in respect of each stripe, a parity sector of parity data. The sectors of data and the parity sector representing the parity of each stripe are written onto different storage devices.

23 Claims, 5 Drawing Sheets

| Disk 0 | Disk 1 | Disk 2 | Disk 3 |
|---|---|---|---|
| S0 | S1 | S2 | P(0,1,2) |
| S3 | S4 | S5 | P(3,4,5) |
| S6 | S7 | P(6,7) | S8 |
| S9 | S10 | P(8,9,10) | S11 |
| S12 | S13 | P(11,12,13) | S14 |
| S15 | P(14,15) | S16 | S17 |
| S18 | P(16,17,18) | S19 | S20 |
| S21 | P(19,20,21) | S22 | S23 |
| P(22,23) | S24 | S25 | S26 |
| P(24,25,26) | S27 | S28 | S29 |
| P(27,28,29) | S30 | S31 | P(30,31) |

U.S. PATENT DOCUMENTS

| | | |
|---|---|---|
| 6,385,711 B1 | 5/2002 | Colligan |
| 6,862,609 B2 * | 3/2005 | Merkey .......................... 709/214 |
| 6,880,060 B2 | 4/2005 | Talagala et al. |
| 7,055,058 B2 * | 5/2006 | Lee et al. ..................... 714/6.32 |
| 2005/0132134 A1 | 6/2005 | Chien |
| 2005/0149678 A1 * | 7/2005 | Stolowitz ...................... 711/114 |

* cited by examiner

Fig. 1

| Disk 0 | Disk 1 | Disk 2 | Disk 3 |
|---|---|---|---|
| S0 | S1 | S2 | P(0,1,2) |
| S3 | S4 | S5 | P(3,4,5) |
| S6 | S7 | S? | P(6,7,?) |

Fig. 3

| Disk 0 | Disk 1 | Disk 2 | Disk 3 |
|---|---|---|---|
| S0 | S1 | S2 | P(0,1,2) |
| S3 | S4 | S5 | P(3,4,5) |
| S6 | S7 | P(6,7) | |

Fig. 4

| Disk 0 | Disk 1 | Disk 2 | Disk 3 |
|---|---|---|---|
| S0 | S1 | S2 | P(0,1,2) |
| S3 | S4 | S5 | P(3,4,5) |
| S6 | S7 | P(6,7) | S8 |
| S9 | S10 | P(8,9,10) | S11 |
| S12 | S13 | P(11,12,13) | S14 |
| S15 | P(14,15) | | |

Fig. 5

| Disk 0 | Disk 1 | Disk 2 | Disk 3 |
|---|---|---|---|
| S0 | S1 | S2 | P(0,1,2) |
| S3 | S4 | S5 | P(3,4,5) |
| S6 | S7 | P(6,7) | S8 |
| S9 | S10 | P(8,9,10) | S11 |
| S12 | S13 | P(11,12,13) | S14 |
| S15 | P(14,15) | S16 | S17 |
| S18 | P(16,17,18) | S19 | S20 |
| S21 | P(19,20,21) | S22 | S23 |
| P(22,23) | S24 | S25 | S26 |
| P(24,25,26) | S27 | S28 | S29 |
| P(27,28,29) | S30 | S31 | P(30,31) |

Fig. 6

| Disk 0 | Disk 1 | Disk 2 | Disk 3 | Disk 4 | Disk 5 |
|---|---|---|---|---|---|
| S0 | S1 | S2 | S3 | S4 | P(0,1,2,3,4) |
| S5 | S6 | S7 | P(5,6,7) | S8 | S9 |
| S10 | S11 | S12 | P(8,9,10,11,12) | S13 | S14 |
| S15 | P(13,14,15) | S16 | S17 | S18 | S19 |
| S20 | P(16,17,18,19,20) | S21 | S22 | S23 | P(21,22,23) |

Fig. 7

| Disk 0 | Disk 1 | Disk 2 | Disk 3 | Disk 4 | Disk 5 |
|---|---|---|---|---|---|
| S0 | S1 | S2 | S3 | P(0,1,2,3) | S4 |
| S5 | S6 | S7 | P(4,5,6,7) | S8 | S9 |
| S10 | S11 | P(8,9,10,11) | S12 | S13 | S14 |
| S15 | P(12,13,14,15) | S16 | S17 | S18 | S19 |
| P(16,17,18,19) | S20 | S21 | S22 | S23 | P(20,21,22,23) |

Fig. 8

| Disk 0 | Disk 1 | Disk 2 | Disk 3 | Disk 4 | Disk 5 | Disk 6 |
|---|---|---|---|---|---|---|
| S0 | S1 | S2 | S3 | P(0,1,2,3) | S4 | S5 |
| S6 | S7 | P(4,5,6,7) | S8 | S9 | S10 | S11 |
| P(8,9,10,11) | S12 | S13 | S14 | S15 | P(12,13,14,15) | S16 |
| S17 | S18 | S19 | P(16,17,18,19) | S20 | S21 | S22 |
| S23 | P(20,21,22,23) | S24 | S25 | S26 | S27 | P(24,25,26,27) |
| S28 | S29 | S30 | S31 | P(28,29,30,31) | | |

Fig. 9

| Disk 0 | Disk 1 | Disk 2 | Disk 3 | Disk 4 | Disk 5 | Disk 6 | Disk 7 |
|---|---|---|---|---|---|---|---|
| S0 | S1 | S2 | S3 | P(0,1,2,3) | S4 | S5 | S6 |
| S7 | P(4,5,6,7) | S8 | S9 | S10 | S11 | P(8,9,10,11) | S12 |
| S13 | S14 | S15 | P(12,13,14,15) | S16 | S17 | S18 | S19 |
| P(16,17,18,19) | S20 | S21 | S22 | S23 | P(20,21,22,23) | S24 | S25 |
| S23 | S24 | P(24,25,26,27) | S28 | S29 | S30 | S31 | P(28,29,30,31) |

Fig. 10

| Disk 0 | Disk 1 | Disk 2 | Disk 3 | Disk 4 | Disk 5 | Disk 6 | Disk 7 |
|---|---|---|---|---|---|---|---|
| S0 | S1 | S2 | S3 | S4 | S5 | S6 | P(0,1,2,3,5,5,6) |
| S7 | S8 | S9 | S10 | S11 | S12 | S13 | P(7,8,9,10,11,12,13) |
| S14 | S15 | P(14,15) | | | | | |

WRITING OF DATA ON AN ARRAY OF STORAGE DEVICES WITH CONTROLLED GRANULARITY

CROSS-REFERENCE TO RELATED APPLICATIONS

This application is a 371 U.S. National Stage of International Application No. PCT/GB2007/001825, filed May 18, 2007 and published in English as WO 2007/135381 A2 on Nov. 29, 2007. This application claims the benefit of British Patent Application No. GB 0610335.2, filed May 24, 2006. The disclosures of the above applications are incorporated herein by reference.

The present invention relates to redundant storage of data on an array of storage devices, as for example implemented in a computer system.

The principles of storing data redundantly on an array of storage devices have been known since at least the 1980s and were formally defined in Patterson, Gibson and Katz, "A Case for Redundant Arrays of Inexpensive Disks (RAID)," in ACM Conf. on Management of Data (SIGMOD), pp. 109-116, Chicago, Ill., USA, June 1988. This article coined the acronym RAID for such an array, RAID standing for Redundant Arrays of Inexpensive Disks. Depending on the implementation, such redundant storage is capable of providing advantages of increased capacity, reliability and/or performance. Redundant storage is now commonly implemented in computer systems, including conventional personal computers. The storage devices of the array are commonly implemented as disk drives having a magnetic disk as the storage medium, but the same principles of redundant storage supply to any storage device with any form of storage medium.

Normally, an individual disk drive writes data with a granularity of a sector having a predetermined sector size, for example 512 bytes although in the future this may change to 4096 bytes. Each sector of data is written to a physical sector on the disk of the disk drive. Thus, in a single write operation data is written onto the disk drive in a unit of size equal to a whole number of sectors, the minimum unit of data written to the storage device being one sector. The granularity results from the technical implementation of the storage device, either from the control hardware or increasingly from the software control. Writing is only allowed in respect of entire logical sectors typically specified by a logical block address associated with the data. As a result of the sector granularity, in typical implementations RAID control is implemented using RAID level 4 or 5 (or a development thereof) in which the data written onto the disk drive is striped at the level of a sector. That is, across an array of N disk drives, data is divided into stripes each of size (N−1) sectors, and a parity sector of parity data representing the parity of all the sectors of data in the stripe is calculated. The sectors of data and the parity sector in respect of each stripe are each stored on a different one of the disk drives. In RAID level 4, the parity sector is always the same disk drive, whereas in RAID level 5 the parity sectors for different stripes are distributed across all the disk drives.

As a result of the sector granularity, in typical implementations RAID control is implemented using RAID level 4 or 5 (or a development thereof) in which the data written onto the disk drive is striped at the level of a sector. That is, across an array of N disk drives, data is divided into stripes each of size (N−1) sectors, and a parity sector of parity data representing the parity of all the sectors of data in the stripe is calculated. The sectors of data and the parity sector in respect of each stripe are each stored on a different one of the disk drives. In RAID level 4, the parity sector is always the same disk drive, whereas in RAID level 5 the parity sectors for different stripes are distributed across all the disk drives.

Many computer systems impose a constraint that the data to be written onto the array of storage devices is transferred with a granularity of a transfer unit having a transfer size which is T times the sector size, T being a plural integer. This constraint on the granularity of the transferred data to be written on the storage devices is typically imposed by the operating system of the computer system. For example, the Windows XP operating system imposes this constraint with T equal to $2^M$ where M is an integer between 1 and 7. By default in the Windows XP operating system, M is 3 so that T is 8.

This constraint causes a problem in the writing of data when the number N of disk drives in the array is such that (N−1) is not a factor of T. In the example mentioned above that T is equal to 8, this problem occurs when the number N of storage devices in the array is equal to 4, 6, 7 or 8. In this case, a single transfer unit which is the minimum unit of data written to the array of disk drives, together with the parity sectors, do not fill a whole number of stripes of N sectors across all the disk drives. Whilst part of the transfer unit may fill a whole number of stripes, the remainder of the transfer unit only partially fills a stripe across the N disk drives.

This problem is illustrated in FIG. 1 which shows an example of writing a transfer unit of eight sectors onto an array of four disk drives. In FIG. 1, the columns indicate the disk drives numbered Disk 0 to Disk 3, the rows each indicate a sector on the disk drive, the terms Sx indicate that the sector of the disk drive is written with a sector of data having the index x, and the terms P indicate that the sector of the disk drive is written with a parity sector representing the parity of all the sectors of data whose index numbers are listed in the brackets. Thus, the transfer unit of sectors S0 to S7 and the three parity sectors P fill two complete stripes across all three disk drives, but only partially fill the third stripe. Thus the parity data in respect of the third stripe represents the parity of two sectors S6 and S7 of the transfer unit and also the sector S? which is already stored on disk 2 and is not overwritten. The example shown in FIG. 1 implements RAID level 4, but an equivalent problem arises with RAID level 5.

In order to calculate the parity data of the parity sector for the partially filled stripe, it is necessary to know the data stored on disks in the remainder of the partially filled stripe which will not be overwritten by the transfer unit, for example the sector S? in FIG. 1. This may be achieved by an extra reading operation but that slows down the overall writing operation and also increases the complexity and expense of implementing the control of the array. To minimise the need for the extra read operations, many RAID controllers implement an elaborate caching system. Whilst this can reduce the impact on random access performance, the caching system introduces a significant cost in both the design and implementation of the control.

Of course, this problem can be avoided by selecting the number N of disks in the array having regard to the constraint on the granularity of the transferred data to be written so that (N−1) is a factor of T. However, this is not ideal because it reduces the choice of the number N of disks which may be provided in the array, excluding some numbers N of disks which might be desirable to maximise the fundamental advantages of the redundant storage. In the example given above of T being equal to 8, this restricts the number of storage devices in the array to being 2, 3, 5 or 9.

According to a first aspect of the present invention, there is provided a method of writing data onto an array of N storage devices, where N is an integer of 3 or greater, each storage device being operable to write data with a granularity of a sector having a predetermined sector size, the method being a method of writing data with a granularity of a transfer unit having a transfer size which is T times the sector size, where T is a plural integer, T is greater than (N−1), and (N−1) is not a factor of T, the method comprising:

dividing each transfer unit of data into plural stripes each consisting of a respective plural number of sectors of data having the sector size, the stripes each consisting of at most (N−1) sectors and at least one of the stripes consisting of less than (N−1) sectors;

in respect of each stripe, calculating a parity sector of parity data representing the parity of all the sectors of data in the stripe; and writing each sector of data and each parity sectors onto a respective storage device in the array with the sectors of data and the parity sector in respect of each stripe being written onto different storage devices.

According to a second aspect of the present invention, there is provided a storage device array control apparatus operable to control writing of data onto an array of N storage devices, where N is an integer of 3 or greater, each storage device being operable to write data with a granularity of a sector having a predetermined sector size, the storage device array control apparatus being operable to control writing of data with a granularity of a transfer unit having a transfer size which is T times the sector size, where T is a plural integer, T is greater than (N−1), and (N−1) is not a factor of T, the storage device array control apparatus being operable to divide each transfer unit of data into plural stripes each consisting of a respective plural number of sectors of data having the sector size, the stripes each consisting of at most (N−1) sectors and at least one of the stripes consisting of less than (N−1) sectors, and to calculate, in respect of each stripe, a parity sector of parity data representing the parity of all the sectors of data in the stripe; and the storage device array control apparatus being operable to cause writing of each sector of data and each parity sector onto respective storage devices in the array, the sectors of data and the parity sector in respect of each stripe being written onto different storage devices.

Thus, the present invention handles the writing of data onto an array of storage devices under the constraint that the data is written with a granularity of a transfer unit having a transfer size which is T times the sector size. Under this constraint, the present invention allows number N of storage devices to be chosen such that (N−1) is not a factor of T, whilst simultaneously avoiding the need to know the values of data stored on the storage devices in order to calculate the parity sector. This avoids the need for the write operation to include an additional read operation or for a complex caching system. For example in the above example that the transfer unit has a size of 8 sectors (T=8), the present invention allows the number N of disks in the array to be equal to 4, 6, 7 or 8 without the impact of needing to know the data stored on the storage devices to calculate the parity sector.

This benefit is achieved by using stripes which, including the sectors of data and the parity sector, do not all occupy all the storage devices in the array. That is, at least one of the stripes of sectors of data, from which a parity sector is calculated, is shorter than normal, because is consists of less than (N−1) sectors. By allowing the use of such a shorter stripe, it is always possible to divide each transfer unit into the stripes of appropriate lengths and all parity sectors can be calculated from the data being written.

In the simplest implementation, each transfer unit of data is divided into plural stripes wherein all except one of the stripes consists of (N−1) sectors and one of the stripes consists of R sectors, R being the remainder when T is divided by (N−1). However this has the disadvantage that the length (the number of sectors) of the stripes varies which complicates the implementation. Another, simpler implementation is available in the case that T is equal to k·S, where S is an integer less than (N−1) and k is a plural integer. In this case, the length (the number of sectors) of all the stripes may be maintained constant by dividing each transfer unit into k stripes each consisting of S sectors of data.

Advantageously, the sector of data and the parity sectors are written onto the storage devices at addresses arranged in a pattern which repeats regularly across the storage devices. This simplifies the implementation because it is straightforward to know the pattern at an arbitrary address across the array of sectors and thus to know where the sectors of data and parity sectors are written. As some stripes, including both the sectors of data and the parity sectors, are not written to each of the storage devices, the use of a regularly repeating pattern therefore facilitates the selection of particular sectors for the writing or reading of data at an arbitrary address. For example, the data to be written onto the array of storage devices typically has a logical block address associated therewith. In this case, the sectors of data and the parity sectors may be written onto the storage devices at addresses arranged in said pattern by mapping the logical block addresses to addresses of the storage devices in accordance with said pattern and writing the sectors of data and the parity sectors at the mapped addresses on the storage devices. The same mapping may be applied to read data from a given logical block address.

Typically, the storage devices will be disk drives, but the invention is equally applicable to any other form of storage device.

To allow better understanding, an embodiment of the present invention will now be described by way of non-limitative example with reference to the accompanying drawings, in which:

FIG. 1 is a diagram of the storage of a transfer unit of eight sectors on an array of four disk drives in accordance with RAID level 4;

FIGS. 3 to 5 are diagrams of the storage locations of successive transfer units of eight sectors on an array of four disk drives implemented by the disk array control apparatus of FIG. 2; and FIGS. 6 to 10 are diagrams of the storage locations of transfer units of various numbers of sectors on an array of various numbers of disk drives.

Figure 2:
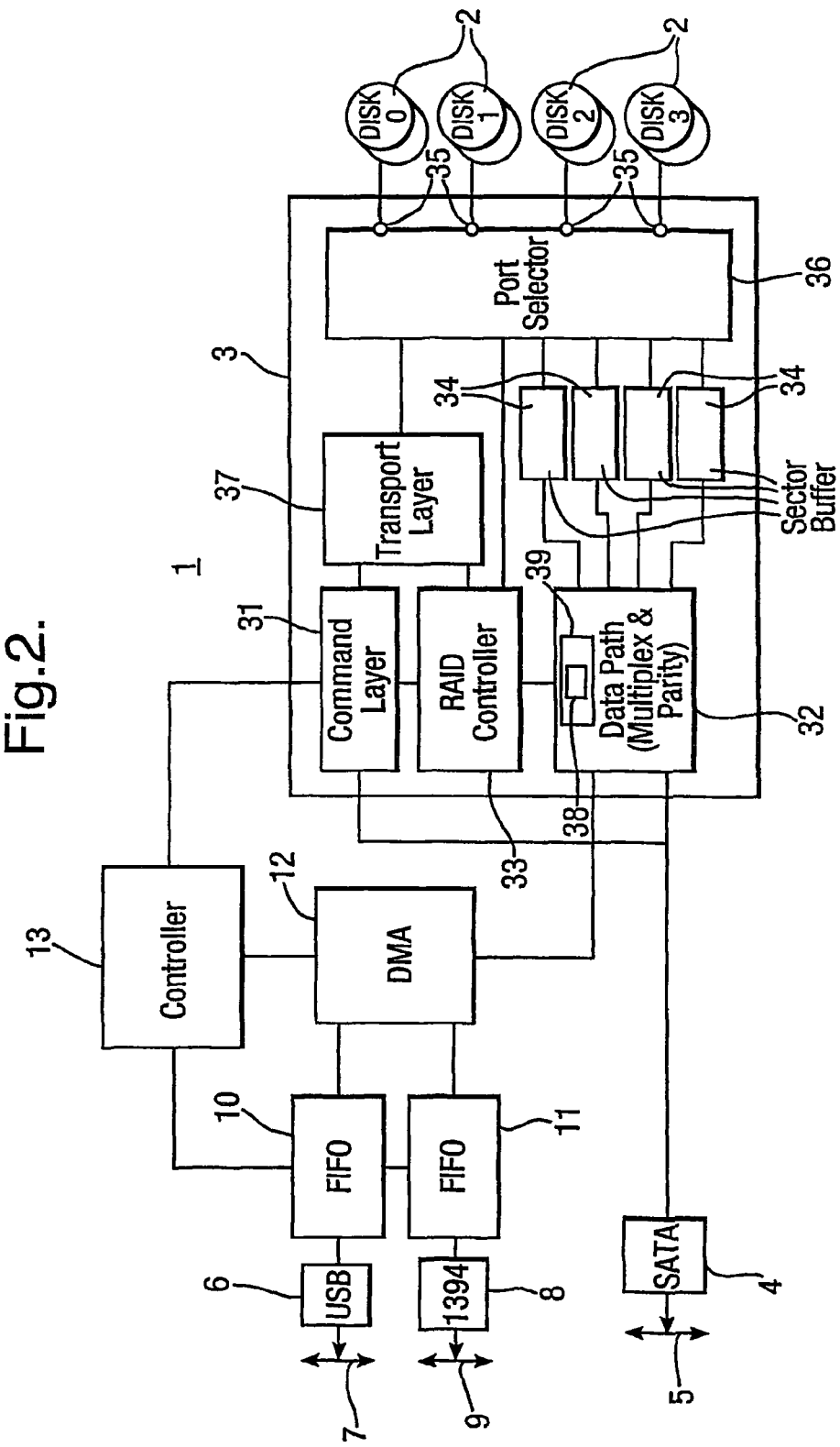
FIG. 2 is a diagram of a disk array control apparatus.

A disk array control apparatus 1 in accordance with the present invention is shown in FIG. 2. The control apparatus 1 is formed in a module which is insertable into a computer apparatus, for example a conventional personal computer. Interaction between the disk array control apparatus 1 and the computer apparatus occurs under the control of the operating system of the computer apparatus. The control apparatus 1 controls the writing of data onto an array of four disk drives 2 and thus is an example of the case that N equals 4.

The disk drives 2 constitute the storage devices and are capable of writing data onto magnetic disks as a form of storage medium. The disk drives 2 are operable to write data with a granularity of a sector having a predetermined size of 512 bytes, although in general any other sector size could be used, for example 4096 bytes. This means that the disk drives 2 are only capable of writing data in a single write operation in units of size one or more sectors. The minimum unit of data written onto the disk drives 2 is sectorsize. Each physical sector of any given disk drive 2 has an address associated therewith.

The disk array control apparatus 1 includes a SATA core 3 which performs writing of data onto the disk drives 2 in accordance with the SATA protocol. The SATA core 3 includes a command layer 31 capable of receiving and interpreting command in accordance with the SATA standard, and a data path 32 which receives data to be written onto the disk drives 2.

The disk array control apparatus 1 further includes a SATA interface 4. The SATA interface 4 is arranged to receive data from a SATA databus 5 which is the databus used for transfer of data internally within the computer apparatus. The SATA interface 4 communicates directly with the SATA core 3. In particular, the SATA interface 4 supplies commands to the command layer 31 of the SATA core 3 and supplies data to be written onto the disk drives 2 to the data path 32 of the SATA core 3.

The disk array control apparatus 1 is further implemented to allow communication with other host protocols, in this example USB and IEEE 1394. In particular, the control apparatus 1 includes a USB interface 6 capable of receiving data from a USB databus 7 in accordance with the USB standard, as well as a 1394 interface 8 capable of receiving data from a 1394 databus 9 in accordance with the IEEE 1394 standard.

The USB interface 6 and the 1394 interface 8 are each connected to a respective FIFO (first-in-first-out) buffer 10 and 11 which buffers data received from the respective one of the USB databus 7 and the 1394 databus 9. The control apparatus 1 includes a DMA (direct memory access) circuit 12 connected between (1) each of the FIFO buffers 10 and 11 and (2) the data path 32 of the SATA core 3.

The control apparatus 1 further includes a system controller 13 which receives USB and 1394 commands received from a host over the USB databus 7 and the 1394 databus 9. The controller 13 translates the USB and 1394 commands into the SATA protocol and supplies them to the command layer 31 of the SATA core 3. The controller 13 also controls the DMA circuit 12 to control data flow between (1) each of the FIFO buffers 10 and 11 and (2) the data path 32 of the SATA core 3.

The data received by the disk array control apparatus 1 through any of the SATA interface 4, the USB interface 6 or the 1394 interface 8 has a granularity of a transfer unit having a transfer size which is $2^M$ times the sector size where M is an integer. Accordingly, this is an example of the case where T is equal to $2^M$. This constraint on the granularity is imposed by the operating system of the computer apparatus in which the control apparatus is inserted. For example, the operating system may be Windows XP. In the Windows XP operating system, the default setting and hence the most commonly encountered setting is that T equals 8. Accordingly, this is an example of a case where the transfer size and the number N of disks is such that T is greater than (N−1) and (N−1) is not a factor of T.

The SATA core 3 is operable to derive parity data from the received data and to write both the received data and the parity data onto the disk drives 2 as follows.

The SATA core 3 includes a RAID controller 33 which operates in response to commands received through the command layer 31 and controls the operation of the SATA core 3. The SATA core 3 further includes four sector buffers 34, one in respect of each disk drive 2. The data path 32 is switchable to direct data to respective sector buffers 34 for supply to a respective disk drive 2. The use of the sector buffers 34 to stream data to the disk drives 2 smooths the flow control. The received data consists of one or more whole transfer units, due to the granularity imposed by the operating system.

The RAID controller 33 controls the operation of the SATA core 3 as follows.

The RAID controller controls switching of the data path 32 to divide each transfer unit of the received data into a plurality of stripes consisting of a plural number of sectors of data. In this example, the transfer unit consisting of eight sectors of data is divided into two stripes consisting of three sectors and one stripe consisting of two sectors. The data path 32 is switched to supply individual sectors of data in each stripe to different sector buffers 34.

The data path 32 includes a parity calculation circuit 38. Under the control of the RAID controller 33, the parity calculation circuit 38 calculates a parity sector of parity data which represents the parity of all the sectors of data in each given stripe. Thus, each bit of the parity sector is the parity of the corresponding bits of each of the sectors of data in the stripe. The parity calculation circuit 38 incorporates a parity buffer 39 to allow calculation of the parity data on the fly from successive sectors of data passing through the data path 32. Until all the sectors of data in a given stripe have passed through the parity calculation circuit 38, the intermediate values of the parity data of the parity sector are stored in the parity buffer 39. The parity calculation circuit 38 performs an XOR operation on the corresponding bits of the parity data in the parity buffer and the sectors of data passing through the data path 32. When the last sector of data in a given stripe has passed through, the data in the parity buffer 39 is output as the parity sector. The parity sector is supplied to a different sector buffer 34 from the sectors of data of the same stripe.

The disk drives 2 are connected to respective ports 35 in the SATA core 3. A port selector 36 in the SATA core 3 is operable to select any of the ports 35 to be connected to any of the sector buffers 34 in order to transfer data from a sector buffer 34 to one of the disk drives 2. The sectors of data and parity sectors stored in each of the sector buffers 34 are supplied to a respective one of the disk drives 2 through one of the ports 35 selected by the port selector 36. The RAID controller 33 controls the operation of the port selector 36 to direct the sectors of data and parity sectors to the desired disk drive 2, as described further below.

In addition, the RAID controller 33 controls the supply of SATA commands to the individual disk drives 2. The RAID controller 33 converts commands received through the command layer 31 into separate SATA commands for each of the disk drives 2. The separate commands are transmitted to the respective disk drives 2 through the ports 35 selected by the port selector 36 under the control of the RAID controller 33. The commands are passed from the command layer 31 to the port selector 36 through a transport layer 37.

The RAID controller 33 synchronises the SATA commands supplied to each disk drive 2 with the supply of the corresponding sectors of data and parity sectors from the sector buffers 34.

The RAID controller 33 controls the data path 32 and port selector 36 so that, in respect of each successive stripe, the successive sectors of data and the parity sector are written onto different disk drives 2. This provides redundancy in the same manner as the known RAID level 4 or 5 because the parity sector is on a different disk drive 2 from the corresponding sectors of data in the stripe. However, in contrast to the known RAID level 4 or 5 the length of one of the stripes, that is the number of sectors of data is less than three, that is (N−1) where N is the number of disks in the array. Similarly the overall length of the stripe including both the sectors of data and the parity sectors is less than N. In the present example the short stripe is the final stripe which consists of two sectors of data and a parity sector, that is three sectors in total.

The consequence of using such a short stripe is that the parity sector in respect of each stripe may be calculated directly from the received data without the need to know the values of any sectors of data stored on any of the disk drives 2. This means that the parity sectors can be calculated without the control apparatus 1 either needing to perform an additional a read operation to read a sector data from one of the disk drives 2 or else needing to implement a caching system to cache sectors of data stored on the disk drives 2. Such avoidance of caching in the controller apparatus 1 can also improve the data integrity in the event of failure during the writing operation.

FIGS. 3 to 5 illustrate the division of data by showing examples of writing data onto the array of four disk drives 2. FIGS. 3 to 5 and indeed all the subsequent figures are of the same form as FIG. 1 and use the same numbering convention.

FIG. 3 shows the writing of a single transfer unit of eight sectors (T=8). Thus, the transfer unit is divided into two stripes of three sectors and a third stripe consisting of only two sectors S6 and S7. Thus, the first two stripes, together with their corresponding parity sectors, are striped across all four disks, but the third stripe together with its parity sector P(6,7) are striped across only three of the four disk drives 2.

FIG. 4 shows an example of writing a further transfer unit of eight sectors (T=8) subsequent to the writing of the transfer unit shown in FIG. 3.

Instead of the amount of data to be written having the size of a single transfer unit, alternatively the amount of data to be written may have a size of plural transfer units. As an example of this, FIG. 5 shows an example of writing of an amount of data having the size of two transfer units onto the disks subsequently to the writing shown in FIG. 4. Alternatively, FIG. 5 may be regarded as showing the writing of an amount of data having a size of four transfer units, that is a total of 32 sectors.

As will be apparent from FIG. 5, the sectors of data and parity sectors written to any individual one of the disk drives 2 are written at successive addresses of the disk drives 2 in question. Consequently, the sectors of data and the parity sectors are written at addresses which arranged in a pattern repeating regularly across the disk drives 2.

In the case that the operating system specifies a logical block address with a granularity of a sector, such a regular pattern facilitates the implementation of data writing and reading at an arbitrary logical block address specified by the operating system. The regularly repeating pattern makes it straightforward for the control apparatus 1 to convert a logical block address specified in a command received in the command layer 31 to a corresponding disk drive 2 and address in that disk drive 2.

In particular, this is achieved by the RAID controller 33 having stored therein a mapping between (a) logical block addresses (LBA) in respect of the data to be written onto the array of disk drives 2 and (b) addresses of the disk drives 2. The mapping represents the pattern which repeats regularly across the disk drives 2. On receipt of a command specifying a logical block address in respect of the data to be written, the RAID controller 33 maps the logical block address to addresses of the disk drive 2 in accordance with the stored mapping. The RAID controller 33 then causes writing of the sectors and data and the parity sectors at the mapped addresses on the disk drives 2. In particular, this mapping is implemented as follows.

The data received at the controller apparatus 1 has a granularity of eight sectors (T=8), so the LBA being a 48 bit binary number includes as its five least significant bits a value of 0, 8, 16 or 24. The value correspond to a start point for writing of data onto the four disks of disk 0, disk 3, disk 2 and disk 1 respectively (for example S0, S8, S16 and S24 in FIG. 5). The mapping of the LBA to the addresses of the disk drives 2 is based on this sequence.

In essence, the data transfers map a sequence of 32 sectors onto a repeating sequence, including the parity sectors, of 44 sectors distributed across four disk drives 2. This is implemented as a transfer unit of 8 sectors mapping onto 11 sectors on the disk drives 2, with four possible starting points. Accordingly, the mapping derives the address for each disk drive 2 by first calculating the command LBA divided by 32 multiplied by 11 and then adding an offset dependent on the five least significant bits of the command LBA. Table 1 shows the required offsets in this example. The remainder from the division can be ignored as the individual offsets in Table 1 accommodate this.

TABLE 1

| 5 LSBs of LBA | Disk0 | Disk1 | Disk2 | Disk3 |
|---|---|---|---|---|
| 0 (00000) | 0 | 0 | 0 | 0 |
| 8 (01000) | 3 | 3 | 3 | 2 |
| 16 (10000) | 6 | 6 | 5 | 5 |
| 24 (11000) | 9 | 8 | 8 | 8 |

The transfer size for the command has also to be mapped in order to accommodate the three extra sectors of parity for every transfer unit of 8 sectors distributed across the four disks. These four values are similarly dependant on the command LBA for the 4 different possible start points, and are also dependant on where in the sequence the transfer stops. A sector count offset is required which will be the difference between these start and end points. Table 2 shows the required offsets. The four possible start points are derived from the five least significant bits of the command LBA and are used to determine the number of sectors per disk required to complete the 44 sector sequence

TABLE 2

| LBA (6 LSB's) | Disk0 | Disk1 | Disk2 | Disk3 |
|---|---|---|---|---|
| 0 (00000) | 11 | 11 | 11 | 11 |
| 8 (01000) | 8 | 8 | 8 | 9 |
| 16 (10000) | 5 | 5 | 6 | 6 |
| 24 (11000) | 2 | 3 | 3 | 3 |

The end point is calculated in similar way from the command LBA added to the command sector count. The five least significant bits of the command LBA are used to determine how many sectors per disk would be needed to complete the last 44 sector sequence boundary, again using the offsets shown in Table 2. The difference between these values will be the required offset. To calculate the rest of the sector count for each disk the command sector count is divided by 32 and then multiplied by 11, but first a similar offset needs to be subtracted to accommodate the start and stop points for 32 data sector sequence. This is simply the difference between the five least significant bits of the command LBA and the five least significant bits of the command LBA added to the command sector count. The resultant value for the command count minus this offset will always be a multiple of 32. Dividing this by 32 and multiplying by 11 gives the value necessary to add to each of the individual disk count value offsets to provide the sector counts.

An example of these calculations will now be given. In the example, the command LBA is 72 (1001000) and the sector count is 48 (110000).

(1) As the five least significant bits of the command LBA are 01000:
  from Table 2, the command LBA offset=8
  from Table 1:
    the Disk 0 LBA offset=3
    the Disk 1 LBA offset=3
    the Disk 2 LBA offset=3
    the Disk 3 LBA offset=2
(2) The base address=the command LBA−offset=72−8=64 (1000000).
(3) Division by 32=2 (10)
(4) Multiply by 11=22
(5) The address for each disk drive 2 is therefore:
  for Disk 0, the address=22+3=25
  for Disk 1, the address=22+3=25
  for Disk 2, the address=22+3=25
  for Disk 3, the address=22+2=24
(6) The command LBA+Command sector count=120 (1111000), and the offset=24 (the five least significant bits)
(7) the command LBA offset=8
(8) the sector count offsets Command LBA=8, so from Table 2:
  for Disk 0, the sector start offset=8
  for Disk 1, the sector start offset=8
  for Disk 2, the sector start offset=8
  for Disk 3, the sector start offset=9
(9) the sector count offsets Command (LBA+Sector Count)=24, so from Table 2:
  for Disk 0, the sector stop offset=2
  for Disk 1, the sector stop offset=3
  for Disk 2, the sector stop offset=3
  for Disk 3, the sector stop offset=3
(10) the offset difference form steps (8) and (9) is:
  for Disk 0, the sector count offset=8−2=6
  for Disk 1, the sector count offset=8−3=5
  for Disk 2, the sector count offset=8−3=5
  for Disk 3, the sector count offset=9−3=6
(11) the difference between the command LBA offset and the command sector count offset=24−8=16
(12) the difference between the command sector count and the offset difference=48−16=32
(13) the base offset=32/32×11=11
  for Disk 0, the sector count=6+11=17
  for Disk 1, the sector count=5+11=16
  for Disk 2, the sector count=5+11=16
  for Disk 3, the sector count=6+11=17
(14) the resultant disc commands are:
  for Disk 0, address=25, Sector Count=17
  for Disk 1, address=25, Sector Count=16
  for Disk 2, address=25, Sector Count=16
  for Disk 3, address=24, Sector Count=17

The above description has focused on the read operation of the disk array control apparatus 1. Of course, the control apparatus 1 is equally able to perform read operations in response to a read command. In this case, the control apparatus 1 performs essentially the reverse operation. This involves mapping of the logical block address specified in a read command into addresses in respect of each disk drives 2 in the same manner as described above for a write operation.

As an alternative, "write alignment" may be performed by the disk array control apparatus 1 reporting to the operating system as being a disk drive with a sector size equal to the transfer size, that is 4096 bytes in the above example. In this case, the operating system will specify logical block addresses with the granularity of the transfer size. In this case, the disk array control apparatus 1 maps the logical block addresses to addresses in the disk drives 2 in a similar manner as described above but the derivation of those addresses in the disk drives 2 is greatly simplified.

When all the disk drives 2 are working properly, the sectors of data are read simultaneously from the disk drives 2 into the sector buffers 34 and then read out in sequence through the data path 32 under the control of the write controller 33. In the event of a failure of a single disk drives 2, the parity sectors are also read from the disk drives 2 into the sector buffers 34 and the missing data from the failed disk drives 2 is reconstructed using the available sector data and the parity sectors.

Of course, the implementation shown in FIG. 2 is merely exemplary and other implementations are possible. Additional buffering can be easily implemented to ease flow control. In the case of implementing the invention in a module insertable into computer apparatus, the functions of the various elements shown in FIG. 2 may in general be implemented by the hardware or in software issued by a microprocessor. Equally, it is possible for the control of the array disk drives 2 to be implemented instead by an operating system of a computer apparatus instead of dedicating this task to a separate module.

The control apparatus shown in FIG. 2 is an example where the number N of disk drives 2 is four. In general, the present invention may be implemented with any number N of disk drives 2 greater than three.

The pattern of writing data shown in FIGS. 3 to 5 is an example of a division of each transfer unit into stripes consisting of different numbers of sectors, in particular with all except one of these stripes consisting of (N−1) sectors and one of the stripes consisting of R sectors where R is the remainder when T is divided by (N−1). The differing lengths of the stripes complicates the mapping between the logical block address and the addresses of the respective disk drives 2. An alternative which simplifies the implementation is available where T is equal to k. S, where S is an integer less than (N−1) and k is a plural integer. In this case, the division of each transfer unit of data may be into k stripe each consisting of S sectors of data. Thus in this case, each sector of data has the same size. This simplifies the implementation.

The advantage of the present invention resulting from at least one of these stripes consisting of less than (N−1) sectors is achieved for any number N disks where (N−1) is not a factor of T. Equally, the present invention may be implemented with other granularities of the data to be written provided that the value of T representing the transfer size of the multiple of the sector size is greater than (N−1). Some examples of alternatives with differing values of the number N of disk and the value T will now be explained.

FIG. 6 illustrates the writing onto an array of six disk drives 2 (N=6) of an amount of data of size three transfer units, the transfer unit being of size eight sectors (T=8). In this case, the transfer unit is divided into a first stripe consisting of five sectors and a second stripe consisting of three sectors. Thus, the stripes are of a division of the transfer units into stripes results in all the parity sectors being on three of the six disk drives.

FIG. 7 also illustrates the writing onto an array of six disk drives 2 (N=6) of an amount of data of size three transfer units, the transfer unit being of size eight sectors (T=8), but with the difference that each transfer unit is divided into two stripes consisting each of four sectors. Therefore, this is an example of the case that T is equal to k·S where S equals four and k equals two. In this case it can be seen from FIG. 7 that the parity sectors are distributed over all the disk drives 2.

FIG. 8 illustrates the writing onto an array of seven disk drives 2 (N=7) of an amount of data of size three transfer units, the transfer unit being of size eight sectors (T=8). In this case, the transfer unit is divided into two stripes each consisting of four sectors, as in the example of FIG. 7. Again, this division of transfer units results in the parity sectors being distributed over all the disk drives 2.

FIG. 9 illustrates the writing onto an array of eight disk drives 2 (N=8) of an amount of data of size three transfer units, the transfer unit being of size eight sectors (T=8). Each transfer unit is divided into two stripes each consisting of four sectors, as the examples of FIGS. 7 and 8.

FIG. 10 illustrates the writing onto an array of eight disk drives 2 (N=8) of a transfer unit of size sixteen sectors (T=6). In this case, the transfer unit is divided into two stripes each consisting of seven sectors and a third tripe consisting of two sectors.

It is a feature of the present invention that at least one of the stripes consists of less than (N−1) sectors and consequently that the overall number of parity sectors is increased as compared to RAID level 4 or 5 in which there is a parity sector in respect of each stripe of (N−1) sectors of data. As a result, there is a reduction in the storage utilisation, that is the percentage of the capacity of the disk drives 2 on which useful data is stored. By way of example, Table 3 illustrates the storage utilisation of the present invention with certain values of N and T, compared with the storage utilisation of RAID level 4 or 5 with the same number N of disk drives 2. As can be seen, the reduction in the storage utilisation is relatively low.

TABLE 3

| N | T | No. of Parity Stripes | Storage Utilization (%) | Storage Utilization (%) of RAID Level 4 or 5 |
|---|---|---|---|---|
| 4 | 8 | 3 | 73 | 75 |
| 6 | 8 | 2 | 80 | 83 |
| 7 | 8 | 2 | 80 | 86 |
| 8 | 8 | 2 | 80 | 88 |
| 8 | 16 | 3 | 84 | 88 |

Figure 11:
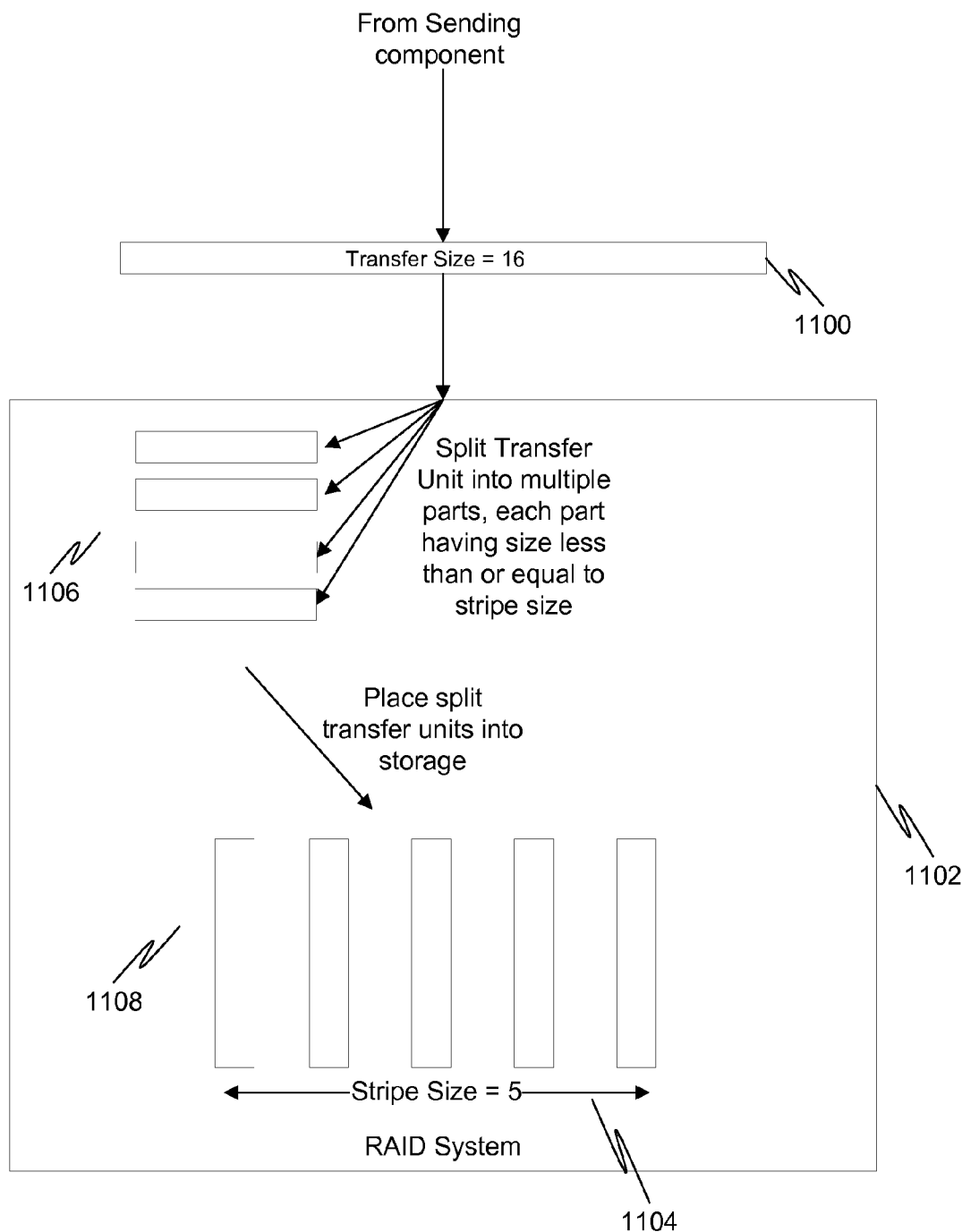

FIG. 11 is a diagram illustrating an example method in accordance with an embodiment of the present invention. A transfer unit 1100 is sent from a sending component to a RAID System 1102. The transfer unit 1100 has a transfer size that is set by the operating system. Here it is set at 16. This means that the transfer size is 16 times as large as the smallest granularity sector size in the system. Notably, this transfer size is larger than the stripe size 1104, which here is set at 5. This is due to the fact that the RAID System 1102 has no control over the transfer size. The RAID System 1102 then splits the transfer unit into multiple parts 1106, each part having a size less than or equal to the stripe size. These split transfer units 1106 can then be placed into the storage 1108.

The invention claimed is:

1. A storage device array control apparatus operable to control writing of data onto an array of N storage devices, where N is an integer of 3 or greater, each storage device being operable to write data with a granularity of a sector having a predetermined sector size, the storage device array control apparatus being operable to control writing of data with a granularity of a transfer unit having a transfer size which is T times the sector size, where T is a plural integer representing the largest amount of data that is transmitted to the storage device array control apparatus at one time, T is greater than (N−1), and (N−1) is not a factor of T, and wherein T is fixed by operating system specifications outside of the control of the storage device array control apparatus, wherein a file to be transmitted to the storage device control apparatus is divided into transfer units, the storage device array control apparatus being operable to divide each transfer unit of data into plural stripes each consisting of a respective plural number of sectors of data having the sector size by splitting the transfer unit into multiple parts, the stripes having a size S, wherein S is less than T, and to calculate, in respect of each stripe, a parity sector of parity data representing the parity of all sectors of data in the stripe only and not including any sectors of data already stored on a storage device in the array; and the storage device array control apparatus being operable to cause writing of each sector of data and each parity sector onto respective storage devices in the array, the sectors of data and the parity sector in respect of each stripe being written onto different storage devices.

2. A storage device array control apparatus according to claim 1, wherein the storage device array control apparatus is operable to cause writing of the sectors of data and the parity sectors to the storage devices at addresses arranged in a pattern which repeats regularly across the storage devices.

3. A storage device array control apparatus according to claim 2, wherein the storage device array control apparatus has stored therein a mapping between (a) logical block addresses in respect of the data to be written onto the array of storage devices and (b) addresses of the storage devices in accordance with said pattern which repeats regularly across the storage devices, the storage device array control apparatus being operable to cause writing of the sectors of data and the parity sectors to the storage devices at addresses arranged in said pattern by mapping logical block addresses in respect of the data to be written to addresses of the storage devices in accordance with the stored mapping and causing writing of the sectors of data and the parity sectors at the mapped addresses on the storage devices.

4. A storage device array control apparatus according to claim 1, wherein the storage device array control apparatus is operable to divide each transfer unit of data into plural stripes each consisting of a respective number sectors of data having the sector size, all except one of the stripes consisting of (N−1) sectors and one of the stripes consisting of R sectors where R is the remainder when T is divided by (N−1).

5. A storage device array control apparatus according to claim 1, wherein T is equal to k·S, where S is an integer less than (N−1) and k is a plural integer, and the storage device array control apparatus is operable to divide each transfer unit of data into k stripes each consisting of S sectors of data having the predetermined sector size.

6. A storage device array control apparatus according to claim 1, wherein the sector size is 512 bytes.

7. A storage device array control apparatus according to claim 1, wherein the sector size is 4096 bytes.

8. A storage device array control apparatus according to claim 1, wherein T is equal to $2^m$ where M is an integer.

9. A storage device array control apparatus according to claim 7, wherein T is equal to 8 and N is equal to 4, 6, 7 or 8.

10. A storage device array control apparatus according to claim 1, wherein the storage devices are disk drives.

11. A storage device array control apparatus according to claim 1, wherein the storage device array control apparatus includes a data path to which the data to be written is supplied, the data path including a parity calculation circuit operable to perform said dividing of each transfer unit of data and said calculating parity sectors and the data path being switchable to direct the sectors of data and the parity sectors to respective storage devices.

12. A storage device array control apparatus according to claim 11, wherein the storage device array control apparatus includes a controller which is operable to control the operation of the data path.

13. A storage device array control apparatus according to claim 1, wherein the storage device array control apparatus comprises an interface for receiving data from a databus, the storage device array control apparatus operable to control writing of data received from the interface.

14. A storage device array control apparatus according to claim 1, wherein the storage device array control apparatus is formed in a module which is insertable into a computer apparatus.

15. A method of writing data onto an array of N storage devices, where N is an integer of 3 or greater, each storage device being operable to write data with a granularity of a sector having a predetermined sector size, the method being a method of writing data with a granularity of a transfer unit having a transfer size which is T times the sector size, where T is a plural integer representing the largest amount of data that is transmitted to the storage device array control apparatus at one time, T is greater than (N−1), and (N−1) is not a factor of T, and wherein T is fixed by operating system specifications outside of the control of the storage device array control apparatus, wherein a file to be transmitted to the storage device control apparatus is divided into transfer units, the method comprising;

dividing each transfer unit of data into plural stripes each consisting of a respective plural number of sectors of data having the sector size by splitting the transfer unit into multiple parts, the stripes having a size S, wherein S is less than T;

in respect of each stripe, calculating a parity sector of parity data representing the parity of all the sectors of data in the stripe; and writing each sector of data and each parity sectors onto a respective storage device in the array with the sectors of data and the parity sectors and the parity sector in respect of each stripe being written onto different storage devices.

16. A method according to claim 15, wherein the sectors of data and the parity sectors are written onto the storage devices at addresses arranged in a pattern which repeats regularly across the storage devices.

17. A method according to claim 16, wherein the data to be written onto the array of storage devices has logical block addresses in respect thereof, and the sectors of data and the parity sectors are written onto the storage devices at addresses arranged in said pattern by mapping the logical block addresses to addresses of the storage devices in accordance with said pattern and writing of the sectors of data and the parity sectors at the mapped addresses on the storage devices.

18. A method according to claim 15, wherein all except one of the stripes consists of (N−1) sectors and one of the stripes consists of R sectors where R is the remainder when T is divided by (N−1).

19. A method according to claim 15, wherein T is equal to k·S, where S is an integer less than (N−1) and k is a plural integer, and each transfer unit is divided into k stripes each consisting of S sectors of data.

20. A method according to claim 15, wherein the sector size is 512 bytes.

21. A method according to claim 15, wherein T is equal to $2^m$ where M is an integer.

22. A method according to claim 21, wherein T is equal to 8 and N is equal to 4, 6, 7 or 8.

23. A method according to claim 15, wherein the storage devices are disk drives.

\* \* \* \* \*